P. RILEY.
Fruit-Drier.
No. 200,479. Patented Feb. 19, 1878.
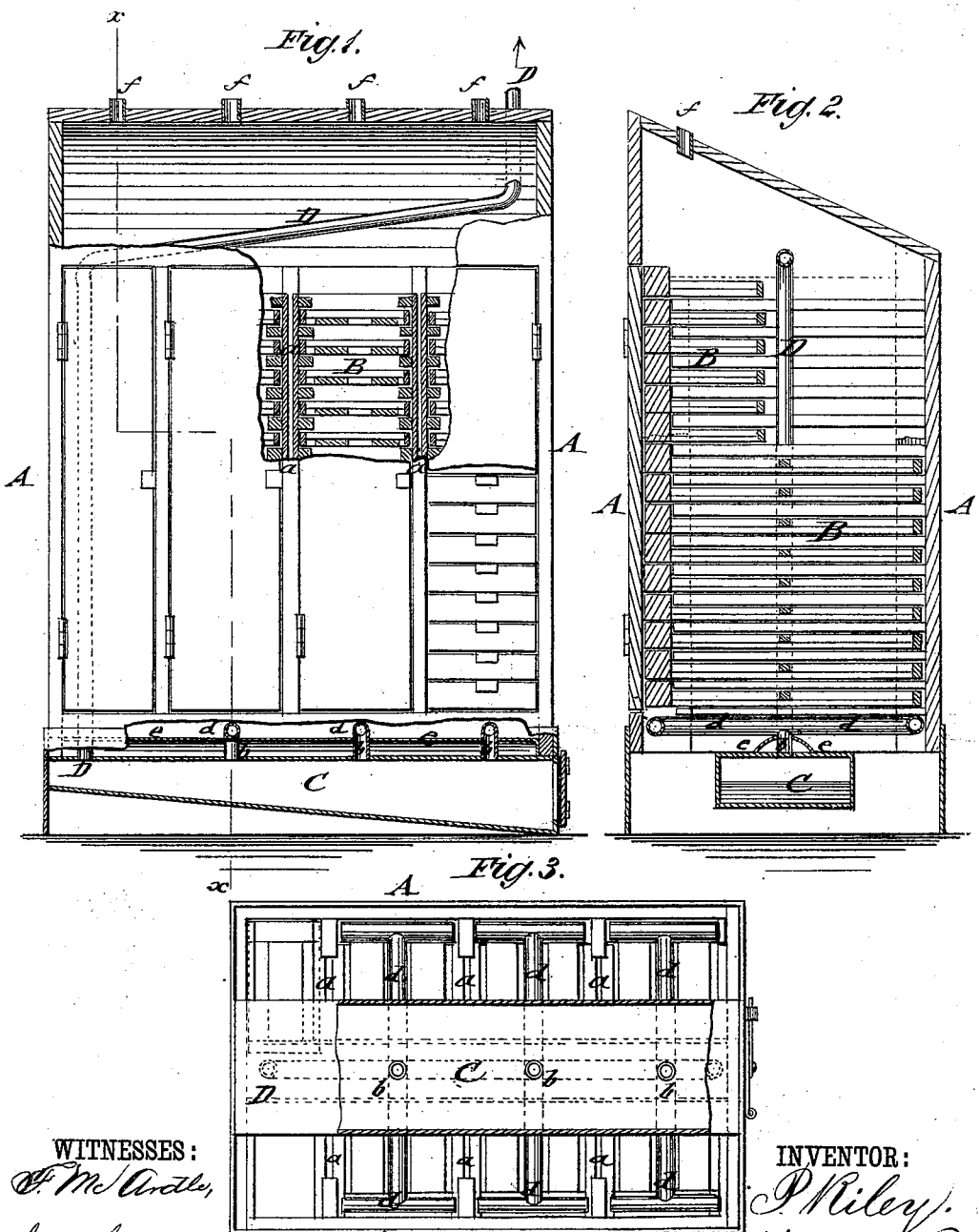
WITNESSES:
F. McArdle,
J. H. Scarborough.
INVENTOR:
P. Riley.
BY Munn & Co.
ATTORNEYS.

UNITED STATES PATENT OFFICE.

PETER RILEY, OF FORT SCOTT, KANSAS.

IMPROVEMENT IN FRUIT-DRIERS.

Specification forming part of Letters Patent No. 200,479, dated February 19, 1878; application filed November 19, 1877.

*To all whom it may concern:*

Be it known that I, PETER RILEY, of Fort Scott, in the county of Bourbon and State of Kansas, have invented a new and Improved Fruit-Drier, of which the following is a specification:

In the accompanying drawings, Figure 1 represents a front elevation of my improved fruit-drier, partly in section, through fire-chamber and top part. Fig. 2 is a vertical transverse section of the same on line $x\ x$, Fig. 1; and Fig. 3, a bottom view of the drier with part of the fire-chamber broken off.

Similar letters of reference indicate corresponding parts.

The invention has reference to an improved fruit-drier whose trays are conveniently reached from the outside, and in which the heat is uniformly distributed in the interior, and a regular current of heated air kept up through the trays, the fruit being not exposed to a too great degree of heat, so as to be burned in any part of the drier.

The invention consists of a fruit-drier having several tiers of sliding fruit-trays arranged laterally above a longitudinal fire-chamber at the bottom part of the drier. The tiers of trays are separated by vertical draft-channels, and the front and rear parts of the trays heated up by lateral T-shaped pipes. A convex-top guard-plate on the central part of the fire-chamber protects the center of the trays against too great heat. The smoke-pipe of the fire-chamber extends upward at the rear of a shorter tier of trays, and centrally through the space at the top part of the drier, to reheat the air at the top part and keep up a draft through the trays to the top exit-holes.

Referring to the drawings, A represents the outer walls or casing of my improved fruit-drier, which is closed at the rear and sides, and provided at the front part with hinged doors that close the vertical tiers of fruit-trays B. The drier is supported on a suitable brick or stone foundation, and has a fire-chamber, C, that extends at the bottom of the drier, at right angles to the trays, longitudinally from one side to the opposite one.

Between the tiers of trays are draft spaces or passages $a$ for the heated air, which passes also through the slat bottoms of the trays to the space at the top part of the drier. The heat is conducted, by short vertical pipes $b$ and horizontal pipes $d$, with T ends from the center or hottest part of the fire-chamber to the front and rear ends of the trays, and the middle part of the fire-chamber covered by a convex-top guard-plate, $e$, that extends over the entire length of the fire-chamber.

The horizontal pipes distribute the heat to the ends of the trays, while the guard-plate protects the middle part of the trays against the more intense heat at the center of the fire-chamber, the T-pipes and guard-plate producing a uniform degree of heat throughout the entire drier.

The smoke-pipe D extends upward from the end of the fire-chamber, and passes through the rear of the drying-chamber into the top space of the latter, or above the trays. At this point the smoke-pipe takes a bend to the joint of the drier, and is conducted through the inclined roof of the latter. The smoke-pipe reheats the air at the upper part of the drier, and secures thereby a free draft through the trays, and through the exit-openings $f$ at the roof of the drier. The fruit on the trays is thereby dried in uniform and reliable manner, every part of the drier readily controlled, and a continuous current of heated air kept up through the trays, so as to expedite the drying process.

Having thus described my invention, I claim as new and desire to secure by Letters Patent—

1. In a fruit-drier, the combination of one or more tiers of lateral trays, separated by vertical passages, with a longitudinal fire-place extending at right angles thereto, and having lateral pipes with T ends, and a central concave guard-plate, to distribute the heat equally through the drier, substantially as and for the purpose set forth.

2. In a fruit-drier, the combination of one or more tiers of fruit-trays and a shorter end tier of trays with a longitudinal fire-place extending at right angles below the trays, and with a smoke-pipe that extends upward back of the short tier of trays, then at suitable inclination through the top part, and to the outside at the opposite end, to keep up a uniform current of heated air through the trays and the top openings, substantially as and for the purpose set forth.

PETER RILEY.

Witnesses:
IRA D. BRONSON,
JOHN R. WILLIAMS.